(12) United States Patent
Kojima et al.

(10) Patent No.: US 8,695,656 B2
(45) Date of Patent: *Apr. 15, 2014

(54) TIRE

(75) Inventors: Takaaki Kojima, Higashimurayama (JP); Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/389,227

(22) PCT Filed: Nov. 25, 2009

(86) PCT No.: PCT/JP2009/006363
§ 371 (c)(1),
(2), (4) Date: Apr. 17, 2012

(87) PCT Pub. No.: WO2011/016100
PCT Pub. Date: Feb. 10, 2011

(65) Prior Publication Data
US 2012/0186711 A1 Jul. 26, 2012

(30) Foreign Application Priority Data
Aug. 7, 2009 (JP) .................. 2009-185275

(51) Int. Cl.
*B60C 11/04* (2006.01)
*B60C 11/12* (2006.01)
(52) U.S. Cl.
USPC ............ 152/209.15; 152/209.17; 152/209.18; 152/209.22; 152/DIG. 3
(58) Field of Classification Search
USPC ............... 152/209.18, 209.8, 209.15, 209.21, 152/901, DIG. 3, 209.17, 209.22
See application file for complete search history.

(56) References Cited

U.S. PATENT DOCUMENTS

| 580,070 A | 4/1897 | Welch | |
|---|---|---|---|
| 2009/0165908 A1* | 7/2009 | Takahashi et al. | 152/209.18 |
| 2009/0272474 A1* | 11/2009 | Nagai et al. | 152/209.18 |

FOREIGN PATENT DOCUMENTS

| CN | 101360619 A | 2/2009 |
|---|---|---|
| JP | 2007-331412 A | 12/2007 |
| JP | 2008-302898 A | 12/2008 |

(Continued)

OTHER PUBLICATIONS

Machine Translation: JP2009001204A; Nagai; (no date).*

(Continued)

*Primary Examiner* — Richard Crispino
*Assistant Examiner* — Kendra Shin
(74) *Attorney, Agent, or Firm* — Sughrue Mion, PLLC

(57) ABSTRACT

A pneumatic tire (10) provided with: a rib-like land portion (110), a rib-like land portion (210), and a rib-like land portion (240) which are divided by circumferential grooves (11, 12, 21, 22) extending in the circumferential direction of the tire; and resonators which are recessed inward in the radial direction of the tire, which each form a predetermined space when the rib-like land portion (110) makes contact with the road surface, and which communicate with circumferential grooves. The resonators include first resonators which are provided in the circumferential direction of the tire, and also include second resonators which are, when the tire is mounted on a vehicle, located further toward the inboard side than the first resonators and are arranged in the circumferential direction of the tire. The number of the second resonators is greater than the number of the first resonators.

3 Claims, 13 Drawing Sheets

(56) References Cited

FOREIGN PATENT DOCUMENTS

| | | | | |
|---|---|---|---|---|
| JP | 2009001204 | * | 1/2009 | ............. B60C 11/00 |
| JP | 4394161 B1 | | 1/2010 | |
| JP | 2010-274860 A | | 12/2010 | |
| WO | WO 2007/072824 A1 | | 6/2007 | |
| WO | WO2007072824 | * | 6/2007 | ............. B60C 11/04 |
| WO | WO 2007114430 A1 | * | 10/2007 | ............. B60C 11/13 |
| WO | WO 2008/143034 A1 | | 11/2008 | |

OTHER PUBLICATIONS

International Search Report, PCT/JP2009/006363, Jan. 19, 2010.
Chinese Office Action issued in Chinese Application No. 200980160820.4 dated Nov. 5, 2012.

Chinese Office Action issued in Chinese Application No. 200980160820.4 dated Jul. 9, 2013.

* cited by examiner

VEHICLE MOUNTED INNER SIDE ⟷ VEHICLE MOUNTED OUTER SIDE

FIG. 4
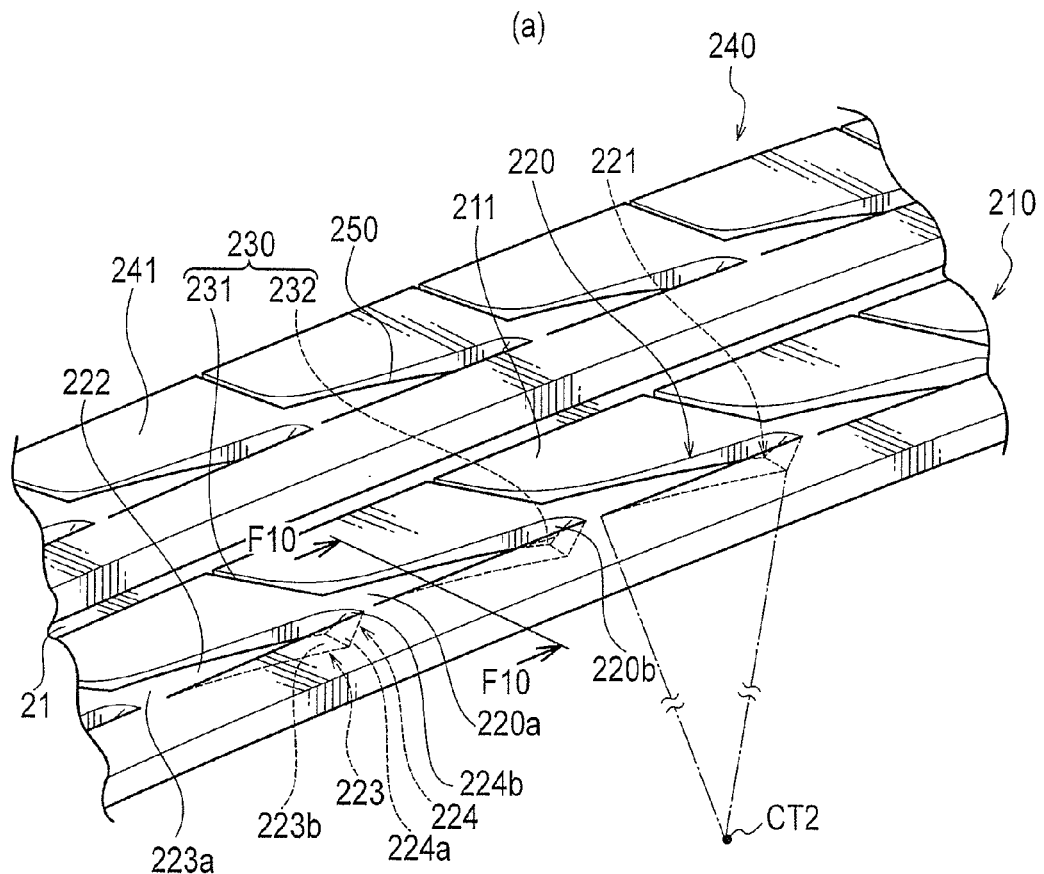
(a)
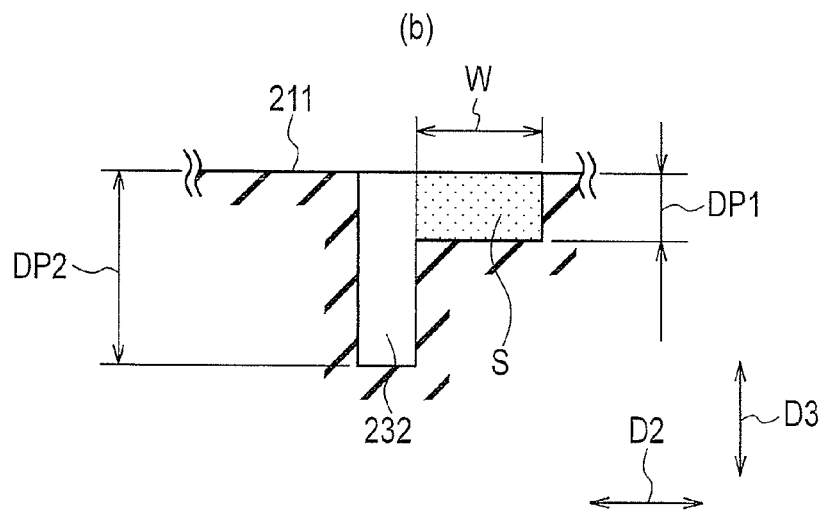
(b)

VEHICLE MOUNTED INNER SIDE ←⎯⎯→ VEHICLE MOUNTED OUTER SIDE

TIRE

CROSS REFERENCE TO RELATED APPLICATIONS

This application is a National Stage of International Application No. PCT/JP2009/006363 filed Nov. 25, 2009, claiming priority based on Japanese Patent Application No. 2009-185275, filed Aug. 7, 2009, the contents of all of which are incorporated herein by reference in their entirety.

TECHNICAL FIELD

The present invention relates to a tire provided with resonators which are recessed inward in the tire radial direction, which each form a predetermined space when the rib-like land portion makes contact with the road surface, and which communicate with circumferential grooves.

BACKGROUND ART

Conventionally, in tires mounted on passenger vehicles, various methods have been materialized to reduce the air column tube resonance sound caused by spaces formed by circumferential grooves extending along the tire circumferential direction and the road surface. For example, there is known a tire in which side-branch resonators having longitudinal grooves which form a fixed space when the tread makes contact with the road surface and which extend along the tire circumferential direction, and lateral grooves which communicate with the longitudinal grooves and circumferential grooves and which extend along the tread width direction are provided in a rib-like land portion which extends along the tire circumstantial direction (for example, Patent Document 1).

PRIOR ART DOCUMENT

Patent Document

Patent Document 1: Japanese Unexamined Patent Application Publication No. 2008-302898 (Pages 3 to 4, FIG. 1)

SUMMARY OF THE INVENTION

Incidentally, in recent years, in passenger vehicles, due to further progress in reduction of vehicle noise (such as wind noise and machine noise), along with further consideration of the environment, the demand for reduction of tire noise is growing more than ever.

Of the tire noise, passage noise caused by air column tube resonance sound becomes external noise. Also, road noise relayed by such as the suspension or the body and propagated in the car, becomes internal noise. In general, external noise has a loudness level peak at around 1 kHz, and internal noise has a peak at a frequency lower than that of external noise. In other words, in the case of the tire provided with the side-branch resonators, external noise can effectively be reduced, but there is still room for improvement in reduction of internal noise.

Therefore, an object of the present invention is to provide a tire which manages reduction of internal noise such as road noise, and reduction of external noise such as passage noise caused by air column tube resonance sound, using resonators that form a fixed space when making contact with the road surface, both at a high level.

To solve the problem described above, the present invention has the following features. A first feature of the present invention is summarized as a tire (pneumatic tire 10) comprising: a plurality of rib-like land portions (rib-like land portions 210, for example) partitioned by a plurality of circumferential grooves (circumferential grooves 11, for example) which extend along a tire circumferential direction; and resonators (first resonators R1, for example) recessed inward in a tire radial direction, forming a predetermined space when the rib-like land portions make contact with a road surface, and communicating with the circumferential groove, wherein the resonators include, first resonators (first resonators R1, R2) provided in a plurality on the rib-like land portions, and second resonators (second resonators R3, R4) located on an inner side of the first resonators when the tire is mounted on a vehicle, and provided in a plurality on at least one of the rib-like land portions, and the number of the second resonators is greater than the number of the first resonators.

With such a tire, the number of second resonators which are, when the tire is mounted on the vehicle, located on the inner side of the first resonators, is greater than the number of first resonators. For this reason, on the rib-like land portion where the second resonators are arranged, more recessed portions are formed than on the rib-like land portion where the first resonators are arranged. With this, the block stiffness of the rib-like land portion where the second resonators are arranged becomes lower than the block stiffness of the rib-like land portion where the first resonators are arranged, and road noise, relayed by such as the suspension or the body and propagated in the car, can be reduced. Especially, since road noise is easily relayed from the inner portion of the tire, when the tire is mounted on the vehicle, close to the suspension and axle shaft, by arranging second resonators in large numbers on the vehicle mounted inner side, road noise generated from the related section can effectively be suppressed.

Also, with the first resonators which are, when the tire is mounted on the vehicle, arranged on the outer side of the second resonators, external noise such as passage noise which is easily propagated externally from the vehicle can also be reduced.

In other words, with a tire like this, reduction of internal noise such as road noise, and reduction of external noise such as passage noise caused by air column tube resonance sound, can both be managed at a high level.

A second feature of the present invention according to the first feature is summarized as that a volume of the first resonators is greater than a volume of the second resonators.

A third feature of the present invention according to the first feature or the second feature is summarized as that the second resonator includes, an air chamber recessed inward in the tire radial direction, and a constrictive groove communicating with the air chamber and the circumferential groove, and a volume of a space formed by the constrictive groove and the road surface is less than a volume of a space formed by the air chamber and the road surface, and one end of the constrictive groove communicates with a closed space formed by the air chamber and the road surface, and the other end of the constrictive groove communicates with at least one of the plurality of the circumferential grooves.

With the characteristics of the present invention, using resonators that form a fixed space when making contact with the road surface, it is possible to provide a tire capable of managing reduction of internal noise such as road noise, and reduction of external noise such as passage noise caused by air column tube resonance sound, both at a high level.

BRIEF DESCRIPTION OF THE DRAWINGS

FIG. 4(a) is a partial perspective view of a rib-like land portion 210 and a rib-like land portion 240 according to the embodiment of the present invention, and FIG. 4(b) is a cross-sectional view of an air chamber 220, along the line F10-F10 illustrated in FIG. 4(a), according to the embodiment of the present invention.

MODES FOR CARRYING OUT THE INVENTION

Figure 1:
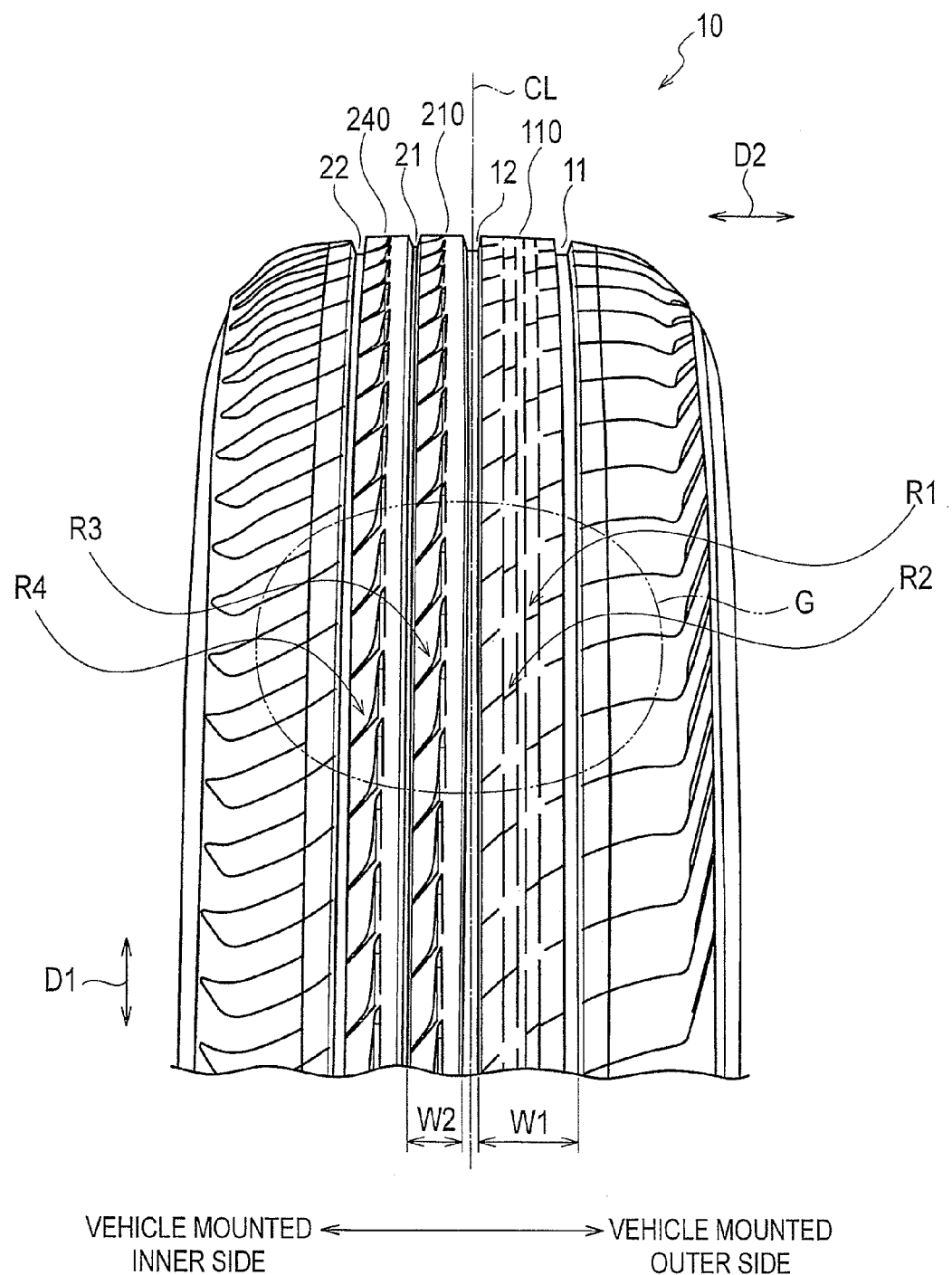
FIG. 1 is a partial front view of a tire according to an embodiment of the present invention.

Next, an embodiment of a tire according to the present invention will be explained while referring to the drawings. Specifically, (1) Overall simplified configuration of tire, (2) Shape of rib-like land portion, (3) Modifications, (4) Comparative evaluations, (5) Operation and effect, and (6) Other embodiments will be explained.

In the following description of the drawings, the same or similar reference numerals are used to designate the same or similar parts. However, it should be appreciated that the drawings are schematically shown and the ratio and the like of each dimension are different from the real ones.

Accordingly, specific dimensions should be determined in consideration of the explanation below. Also, between the different drawings, there are cases that include portions with different ratios and relations of dimensions among each other.

(1) Overall Simplified Configuration of Tire

FIG. 1 is a partial front view of a pneumatic tire 10 according to the embodiment of the present invention. The pneumatic tire 10 is a tire made in consideration of the reduction of tire noise such as air column tube resonance sound, and is to be mounted on passenger vehicles, for example, that demand a high level of silence. Furthermore, the pneumatic tire 10 may be filled with, other than air, an inert gas such as nitrogen gas.

On the pneumatic tire 10, a plurality of circumferential grooves are formed. Specifically, on the pneumatic tire 10, circumferential grooves 11, 12, 21, and 22 are formed. The circumferential grooves 11, 12, 21, and 22 extend along the tire circumferential direction (direction D1 of FIG. 1). Also, on the pneumatic tire 10, partitioned by the circumferential grooves 11, 12, 21, and 22, a plurality of rib-like land portions 110, 210, and 240 are provided.

Specifically, the rib-like land portion 110 is provided between the circumferential groove 11 and the circumferential groove 12, adjacent to the circumferential groove 11 and the circumferential groove 12. The rib-like land portion 110 extends along the tire circumferential direction. The rib-like land portion 110, in reference to the tire equator line CL, is provided on the outer side of when the pneumatic tire 10 is mounted on the vehicle (hereafter mentioned as vehicle mounted outer side). Also, the outer side when mounted on the vehicle is displayed on the pneumatic tire 10 by way of engravings and the like that display the outer side when mounting onto the vehicle. The inner side when mounted on the vehicle, mentioned later, is also displayed on the pneumatic tire 10 by way of engravings and the like that display the inner side when mounting onto the vehicle.

The rib-like land portion 210 is provided between the circumferential groove 12 and the circumferential groove 21, adjacent to the circumferential groove 12 and the circumferential groove 21. The rib-like land portion 240 is provided between the circumferential groove 21 and the circumferential groove 22, adjacent to the circumferential groove 21 and the circumferential groove 22. The rib-like land portion 210 and the rib-like land portion 240 extend along the tire circumferential direction. The rib-like land portion 210 and the rib-like land portion 240, in reference to the tire equator line CL, is provided on the inner side of when the pneumatic tire 10 is mounted on the vehicle (hereafter mentioned as vehicle mounted inner side). Furthermore, the rib-like land portion 210 does not necessarily have to be provided on the inner side, when the tire is mounted on the vehicle, of the tire equator line CL, as long as it is provided on the inner side, when the tire is mounted on the vehicle, of the rib-like land portion 110.

On the pneumatic tire 10, resonators, which are recessed inward in the tire radial direction and which each form a predetermined space when the rib-like land portion makes contact with the road surface, are provided.

(2) Shape of Rib-Like Land Portion

Next, the shape of the rib-like land portion will be explained. Specifically, the shapes of the rib-like land portion 110 and the rib-like land portions 210 and 240 will be explained.

(2.1) Rib-Like Land Portion 110

Figure 2:
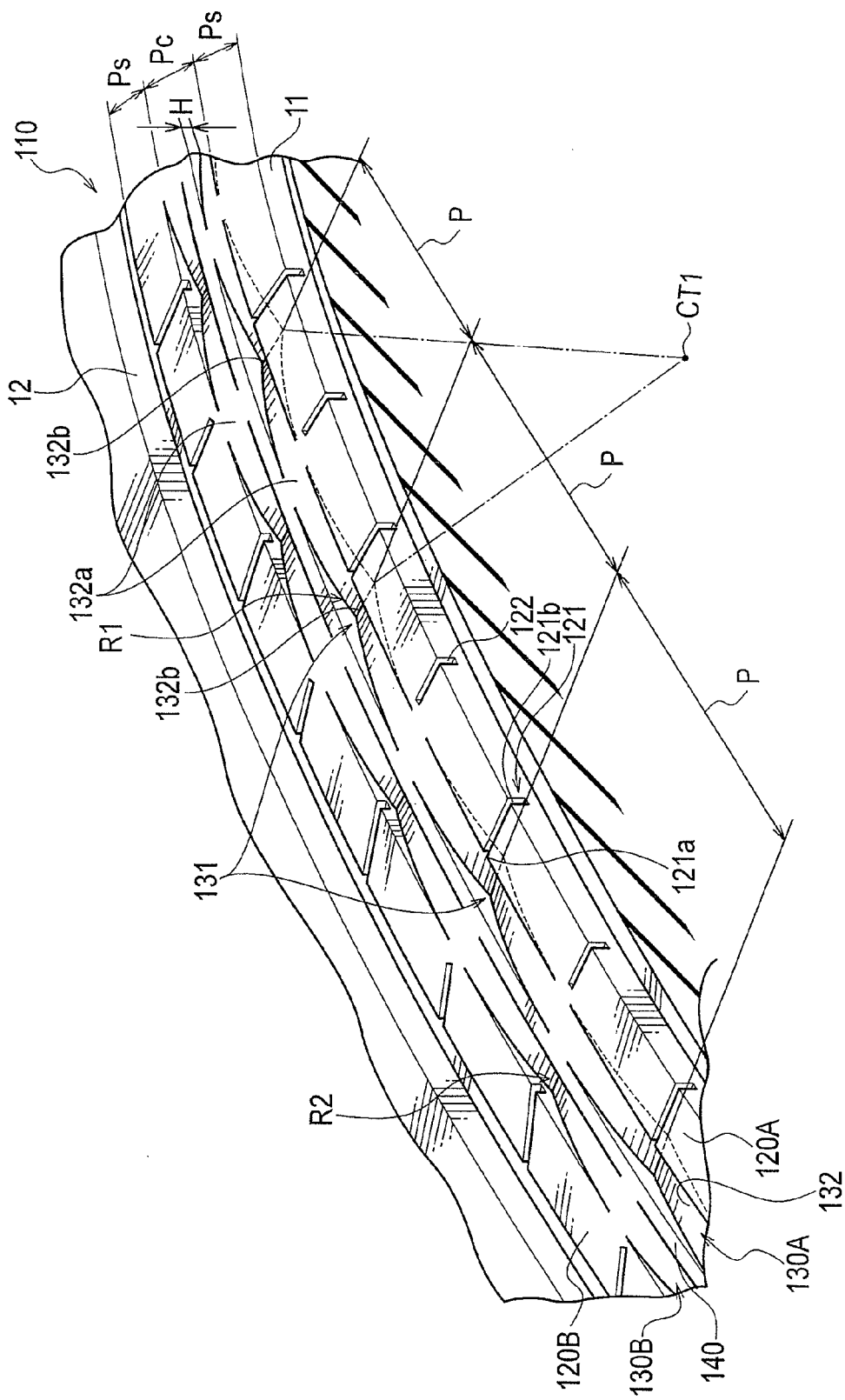
FIG. 2 is a partial perspective view of a rib-like land portion 110 according to the embodiment of the present invention.
Figure 3:
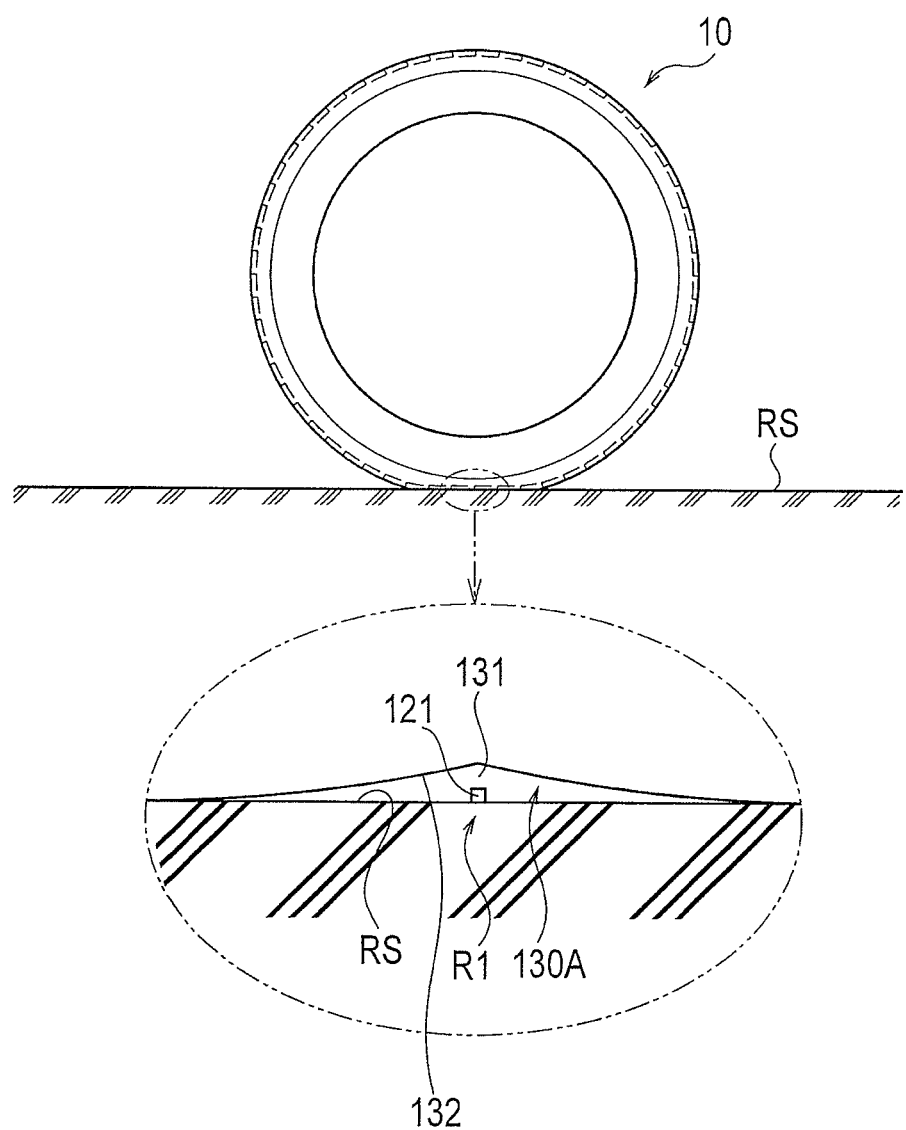
FIG. 3 is a diagram illustrating the shape of a first resonator R1 from a view in the tread width direction.

FIG. 2 is a partial perspective view of the rib-like land portion 110 according to the embodiment of the present invention. FIG. 3 illustrates the shape of a first resonator R1 formed by the pneumatic tire 10 and the road surface RS. Specifically, FIG. 3 is a diagram illustrating the shape of the first resonator R1 from a view in the tread width direction. Also, the area enclosed by the dot and dash line in FIG. 3 illustrates the shape of the first resonator R1 from a view in the tread width direction.

As illustrated in FIG. 2, the rib-like land portion 110 has a land portion 120A, a land portion 120B, and a land portion 140. The land portion 120A, the land portion 120B, and the land portion 140 come into contact with the road surface RS as the pneumatic tire 10 rolls. In other words, the land portion 120A, the land portion 120B, and the land portion 140 configure the contact surface of the pneumatic tire 10 that comes into contact with the road surface RS.

The land portion 120A and the land portion 120B are provided on both ends of the rib-like land portion 110 in the tread width direction (direction D2 of FIG. 1). The land portion 120A is adjacent to the circumferential groove 11. The land portion 120B is adjacent to the circumferential groove 12.

As illustrated in FIG. 2 and FIG. 3, on the rib-like land portion 110, first resonators R1 and first resonators R2, which are recessed inward in the tire radial direction and which each form a predetermined space when the rib-like land portion 110 makes contact with the road surface, are provided. The first resonator R1 and the first resonator R2 configure the first resonator. The first resonator R1 and the first resonator R2, provided in a plurality along the tire circumferential direction, are Helmholtz resonators that include an air chamber and a constrictive groove.

Specifically, on the rib-like land portion 110, the first resonators R1 that communicate to the circumferential groove 11 and are located on the outer side in the tread width direction and the first resonators R2 that communicate to the circumferential groove 12 and are located on the inner side in the tread width direction, are formed. The first resonators R2 are substantially identical to the first resonators R1 except for the point that, in the tread width direction, they are provided between the land portion 120B and the land portion 140 and communicate to the circumferential groove 12, and therefore, the first resonators R1 will be mainly explained, below.

The first resonator R1 includes an air chamber 130A and a constrictive groove 121. The air chamber 130A is an air chamber that communicates to the constrictive groove 121, and includes an recessed portion 131 which is recessed inward in the tire radial direction. The air chamber 130A is provided between the land portion 120A and the land portion 140, in the tread width direction. Specifically, the air chamber 130A is provided on the central portion Pc, in the tread width direction, of the rib-like land portion 110. The air chamber 130A is repeated along the tire circumferential direction in designated pitches P. A height H from the bottom surface 132 of the air chamber 130A to the contact surface (for example, the surface of land portion 120A that comes into contact with the road surface RS), varies along the tire circumferential direction. The center CT1 of the arc of the bottom surface 132 is located on the inner side, in the tire radial direction, of the bottom surface 132. The bottom surface 132 contacts the road surface RS in the highest position 132a where the height to the contact surface is the greatest. Specifically, the bottom surface 132 makes line contact with the road surface RS along a direction different from the tire circumferential direction. In other words, the bottom surface 132 is of a shape in which the width of the bottom surface 132 that comes into contact with the road surface RS, along the tire circumferential direction, is as narrow as possible. The air chamber 130A is formed by the bottom surface 132 between the two highest positions 132a adjacent in the tire circumferential direction, and the road surface RS that comes into contact with the land portion 120A and the land portion 140.

Although the shape of the bottom surface of the air chamber 130B included in the first resonator R2 is identical to the shape of the bottom surface 132, the highest position 132a of the bottom surface 132 of the air chamber 130A and the highest position 132a of the bottom surface of the air chamber 130B, in the tire circumferential direction, are offset by a half-phase of the pitch P.

As illustrated in FIG. 3, the bottom surface 132 of the air chamber 130A, in the cross-sectional view along the tire circumferential direction, is repeated in an arch shape forming an arc.

The constrictive groove 121 is formed on the land portion 120A, and communicates to the air chamber 130A and the circumferential groove 11. Specifically, the constrictive groove 121 is provided on the shoulder portion Ps located on the vehicle mounted outer side of the central portion Pc of the rib-like land portion 110. The constrictive groove 121 communicates to the air chamber 130A. The width of the grooves of the constrictive groove 121 is approximately a few millimeters. The volume of the space formed by the constrictive groove 121 and the road surface RS is less than the volume of the space formed by the air chamber 130A and the road surface.

An end 121a, which is one end of the constrictive groove 121, communicates to the closed space formed by the air chamber 130A and the road surface RS. Specifically, the end 121a communicates to the closed space formed by the recessed portion 131, the highest positions 132a formed on both ends of the recessed portion 131 in the tire circumferential direction, and the road surface RS.

On the other hand, an end 121b, which is the other end of the constrictive groove 121, communicates to at least one of the plurality of the circumferential grooves, or specifically, to the circumferential groove 11. The end 121a communicates to the air chamber 130A in the lowest position 132b where the position of the bottom surface 132 is the lowest. Due to this, the first resonator R1 is shaped to be open only towards the circumferential groove 11.

On the land portion 120A, a narrow groove 122 is formed. The width of the groove of the narrow groove 122 is approximately a few millimeters. The narrow groove 122 communicates only to the circumferential groove 11. In other words, the narrow groove 122 does not communicate to the air chamber 130A. For this reason, the narrow groove 122 is not a constituent component of the first resonator R1.

(2.2) Rib-Like Land Portions 210 and 240

Figure 5:
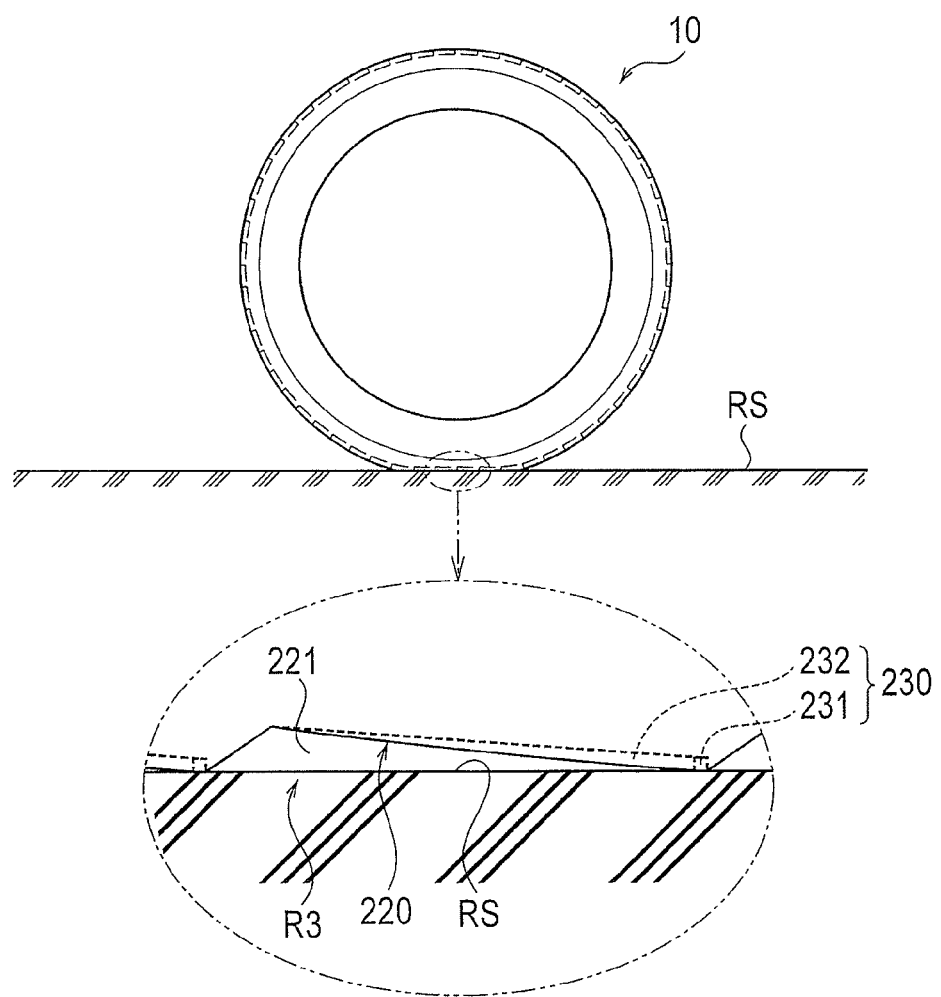
FIG. 5 is a diagram illustrating the shape of a second resonator R3 from a view in the tread width direction.

FIG. 4(a) is a partial perspective view of the rib-like land portion 210 and the rib-like land portion 240 according to the embodiment of the present invention. FIG. 4(b) is a cross-sectional view of an air chamber 220, along the line F10-F10 illustrated in FIG. 4(a), according to the embodiment of the present invention. FIG. 5 illustrates the shape of a second resonator R3 formed by the pneumatic tire 10 and the road surface RS. Specifically, FIG. 5 is a diagram illustrating the shape of the second resonator R3 from a view in the tread width direction. Also, the area enclosed by the dot and dash line in FIG. 5 illustrates the shape of the second resonator R3 from a view in the tread width direction.

As illustrated in FIG. 4, the rib-like land portion 210 has a land portion 211. The rib-like land portion 240 has a land portion 241. The land portion 211 and the land portion 241 comes into contact with the road surface RS as the pneumatic tire 10 rolls. In other words, the land portion 211 and the land portion 241 configure the contact surface of the pneumatic tire 10. The land portion 211 is adjacent to the circumferential groove 21. The land portion 241 is adjacent to the circumferential groove 22. As illustrated in FIG. 4 and FIG. 5, on the land portion 211 of the rib-like land portion 210, second resonators R3, which are recessed inward in the tire radial direction and which forms a predetermined space when the rib-like land portion 210 makes contact with the road surface, are provided. Similarly, on the land portion 241 of the rib-like land portion 240, second resonators R4 are provided. The second resonator R3 and the second resonator R4 configure the second resonator. The second resonator R3 and the second resonator R4, provided in a plurality along the tire circumferential direction, are located on the inner side of the first resonators R1 and the first resonators R2, when the tire is mounted on the vehicle. Since the second resonators R4 are configured identically to the second resonators R3, below, the second resonators R3 will be mainly explained. Also, since the configuration of the second resonator R3 is similar to the configuration of the first resonator R1, explanations of details concerning the common portions will be omitted.

The second resonator R3 includes the air chamber 220 and a constrictive groove 230. The air chamber 220 is an air chamber that communicates to the constrictive groove 230, and includes an recessed portion 221 which is recessed inward in the tire radial direction. The second resonator R4 includes the land portion 241 and an air chamber 250.

As illustrated in FIG. 4(b), the depth DP1 of the recessed portion 221, in reference to the contact surface where the land portion 211 comes into contact with the road surface, varies along the tire circumferential direction. Specifically, the depth DP1 is the deepest at the end 220b which is one end of the air chamber 220 in the tire circumferential direction and the shallowest at the end 220a which is the other end of the air chamber 220.

The bottom surface 222 of the recessed portion 221, in a cross-sectional view along the tire circumferential direction, has a curved portion 223 that is curve shaped. The center CT2 of the arc along the curved portion 223 is located on the inner side, in the tire radial direction, of the bottom surface 222. Furthermore, the curved portion 223 may be configured by a plurality of arcs. In this case, the center CT2 is the center of a single arc approximating the curve formed by the plurality of arcs.

Also, the bottom surface 222 has a linear portion 224 which is of a linear shape in the cross-sectional view along the tire circumferential direction. The linear portion 224 is formed on the end 220b side of the air chamber 220. While an end 224a, which is one end of the linear portion 224, is in line with the end 223b of the curved portion 223, an end 224b, which is the other end of the linear portion 224, is in line with the contact surface where the land portion 211 comes into contact with the road surface.

To the air chamber 220, the constrictive groove 230 communicates. Specifically, one end of the constrictive groove 230 communicates to the end 220a of the air chamber 220 in the tire circumferential direction. In other words, the constrictive groove 230 communicates to the closed space formed by the air chamber 220 and the road surface RS. Also, the other end of the constrictive groove 230, communicates to at least one of the plurality of the circumferential grooves, or specifically, to the circumferential groove 21. The volume of the space formed by the constrictive groove 230 and the road surface is less than the volume of the space formed by the recessed portion 221 and the road surface.

The constrictive groove 230 is configured by an outer groove 231 and an inner groove 232. The outer groove 231 communicates to the circumferential groove 21, and extends to the end 220a of the air chamber 220. The inner groove 232 communicates to the outer groove 231 and extends to the end 220b of the air chamber 220, or specifically, to the side of the linear portion 224. In this embodiment, the inner groove 232 configures the extending portion. The inner groove 232 is formed between the recessed portion 221 and the contact surface where the land portion 211 comes into contact with the road surface.

As illustrated in FIG. 4(b), the constrictive groove 230, or specifically, the depth DP2 of the inner groove 232, is greater than the depth DP1 of the recessed portion 221 from the contact surface where the land portion 211 comes into contact with the road surface.

(2.3) Comparison Between Rib-Like Land Portion 110 and Rib-Like Land Portions 210 and 240

When the first resonators R1 and the first resonators R2 formed on the rib-like land portion 110 mentioned above are compared with the second resonators R3 and the second resonators R4 formed on the rib-like land portion 210 (rib-like land portion 240), the number of the second resonators R3 and the second resonators R4 (the second resonators) is greater than the number of the first resonators R1 and the first resonators R2 (the first resonators). Specifically, the number of the second resonators, which is a sum of the number of the second resonators R3 and the number of the second resonators R4, is greater than the number of first resonators, which is a sum of the number of the first resonators R1 and the number of the first resonators R2. Also, the number of the second resonators R4, which are located on the innermost side when the tire is mounted on the vehicle, is preferably greater than the first resonators R1, the first resonators R2, and the second resonators R3. Also, the number of the first resonators R1, which are located on the outermost side when the tire is mounted on the vehicle, is preferably less than those of the first resonators R2, the second resonators R3, and the second resonators R4.

Also, the volume of each of the air chambers 130A in the first resonators R1 and the first resonators R2 is greater than the volumes of each of the air chambers 220 in the second resonator R3 and the second resonator R4. Also, as illustrated in FIG. 1, the width W1, along the tread width direction, of the rib-like land portion 110, is greater than the width W2, along the tread width direction, of the rib-like land portion 210 (rib-like land portion 240).

Figure 6:
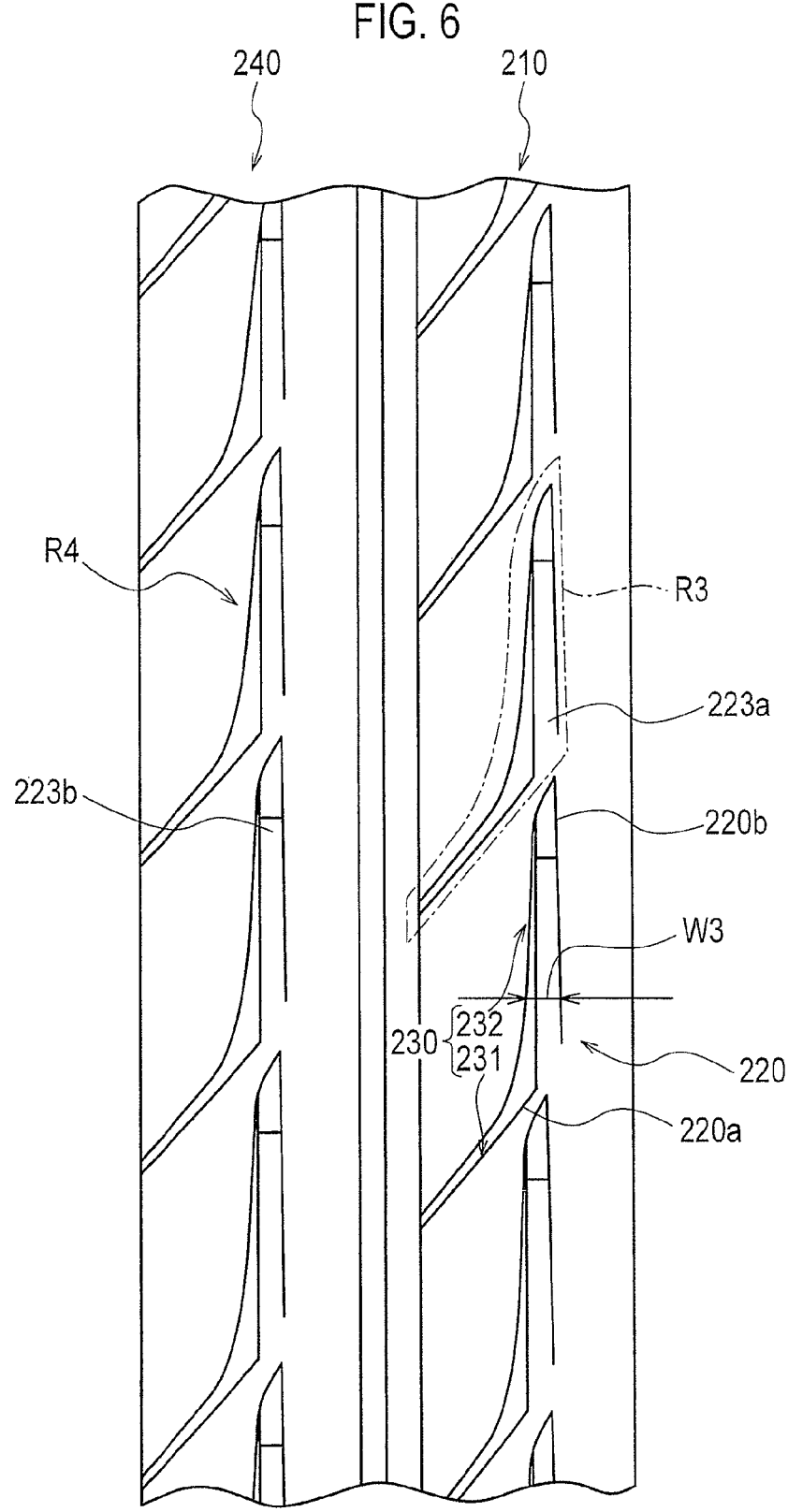
FIG. 6 is a partial enlarged plan view of the rib-like land portion 210 and the rib-like land portion 240.

FIG. 6 is a partial enlarged plan view of the rib-like land portion 210 and the rib-like land portion 240. As illustrated in FIG. 6, the air chamber 220, when viewed from the tread surface, is of a tapering shape, in which the width W3, in the tread width direction, from the end 220a of the air chamber 220, narrows towards the end 220b.

Also, the cross sectional area S (refer to FIG. 4(b)) of the recessed portion 221, along the tread width direction (direction D2) and the tire radial direction (direction D3 in reference to FIG. 4(b)), is substantially the same from the end 223a, which is one end of the curved portion 223 in the tire circumferential direction, to the end 223b which is the other end.

Also, in this embodiment, as illustrated in FIG. 6, the position of the air chamber 220 which is formed on the rib-like land portion 210 in the tire circumferential direction differs from the position of the air chamber 250 which is formed on the rib-like land portion 240. Specifically, the end 223b, located where the depth is the greatest from the contact surface (land portion 241) of the recessed portion formed on the rib-like land portion 240, in the tire circumferential direction, is substantially the same as the end 223a, located where the depth is the least from the contact surface (land portion 211) of the recessed portion 221 formed on the rib-like land portion 210.

(3) Modifications

In the embodiment mentioned above, on the rib-like land portion 110 of the vehicle mounted outer side, the first resonators R1 and the first resonators R2, which are Helmholtz resonators, are provided. Similarly, on the rib-like land portion 210 and the rib-like land portion 240 of the vehicle mounted inner side, the second resonators R3 and the second resonators R4, which are Helmholtz resonators, are provided. In modifications, a rib-like land portion provided with resonators that are side-branch resonators will be explained. Furthermore, in the modifications below, points that differ from the embodiment will be mainly explained, and duplicating explanations will be omitted.

(3.1) First Modification

Figure 7:
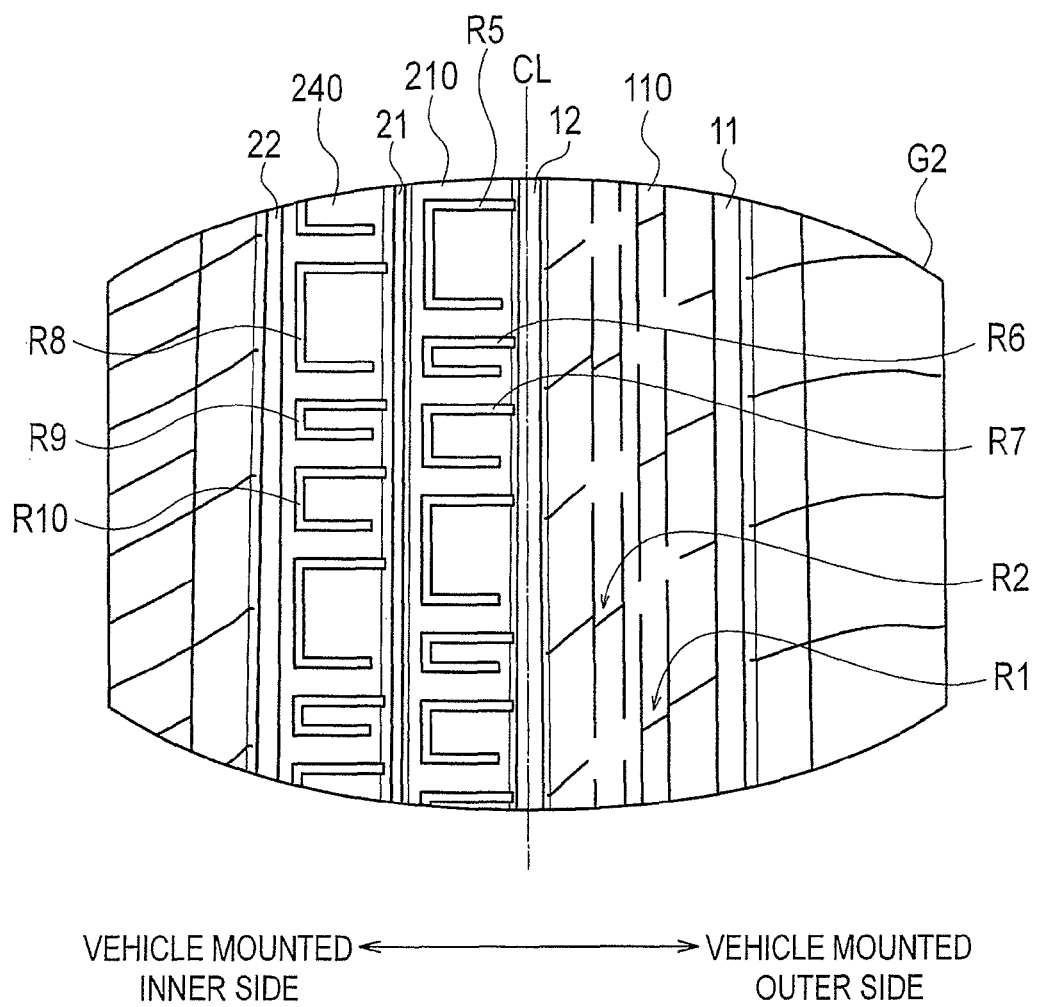
FIG. 7 is a partial front view of the tire according to a first modification of the embodiment of the present invention.
Figure 8:
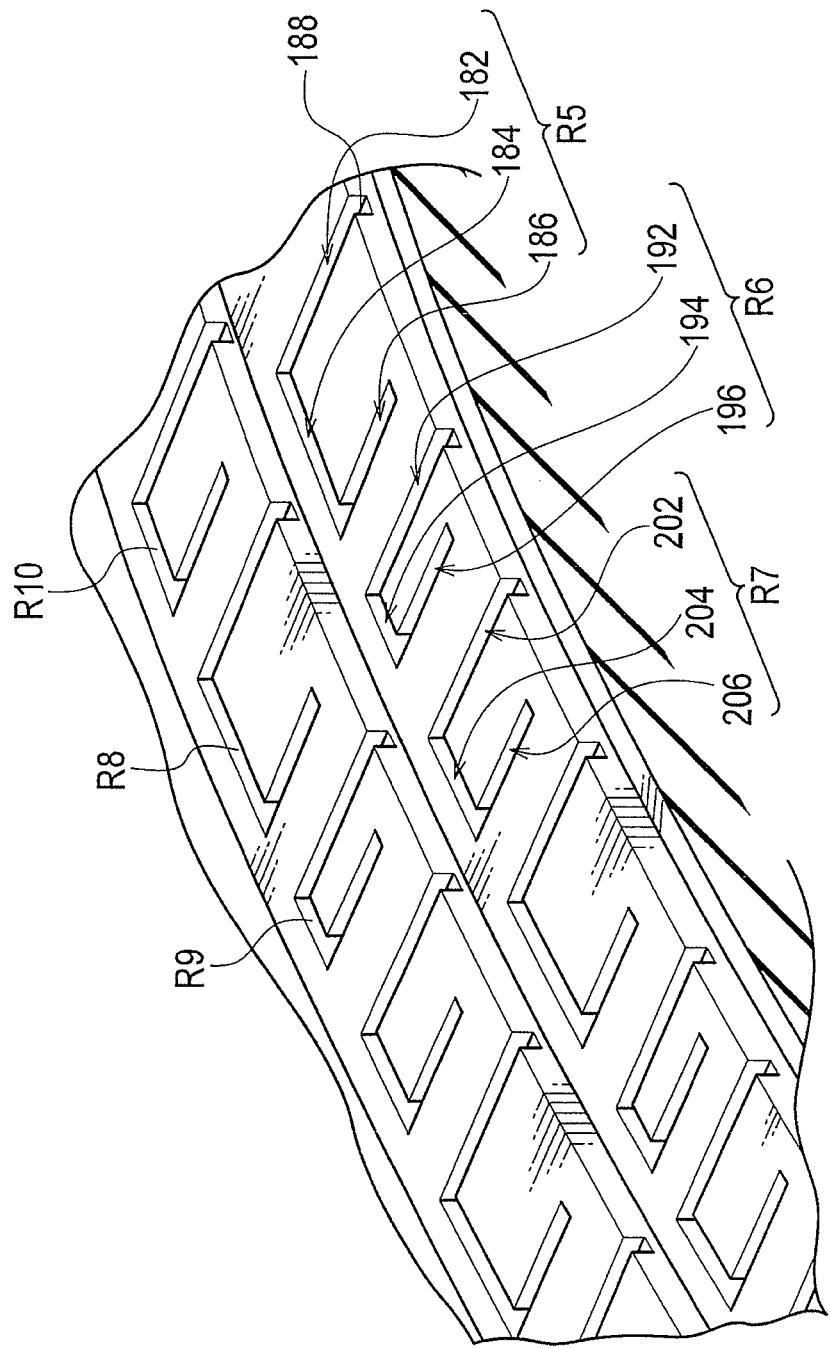
FIG. 8 is a partial perspective view of the rib-like land portion 210 and the rib-like land portion 240 according to the first modification of the embodiment of the present invention.

FIG. 7 is a partial front view of the tire according to a first modification of the embodiment of the present invention. Specifically, FIG. 7 is a front view of the contact surface G2 according to the first modification of the embodiment of the present invention. FIG. 8 is a partial perspective view of the rib-like land portion 210 and the rib-like land portion 240 according to the first modification of the embodiment of the present invention.

As illustrated in FIG. 7, on the rib-like land portion 210 and the rib-like land portion 240, side-branch resonators are provided. Specifically, on the rib-like land portion 210 and the rib-like land portion 240, second resonators R5, R6, R7, R8, R9, and R10, which are recessed inward in the tire radial direction and which each form a predetermined space when the rib-like land portion 210 and the rib-like land portion 240 make contact with the road surface RS, are provided. The second resonators R5, R6, R7, R8, R9, and R10 have longitudinal grooves extending along the tire circumferential direction, and lateral grooves extending along the tread width direction which communicate with the longitudinal grooves and the circumferential grooves.

For example, the second resonator R5 has a longitudinal groove 184, a lateral groove 182, and a lateral groove 186. The longitudinal groove 184 extends along the tire circumferential direction. The lateral groove 182 communicates to one end of the longitudinal groove 184 and the circumferential groove 12, and extends along the tread width direction. The lateral groove 186 communicates to the other end of the longitudinal groove 184 and the circumferential groove 12, and extends along the tread width direction. The widths of the grooves of the lateral groove 182, the longitudinal groove 184, and the lateral groove 186 are substantially the same, and are narrower than the width of the circumferential groove 12. The depths of the grooves, from the contact surface G to the bottom surface 188 of the lateral groove 182, the longitudinal groove 184, and the lateral groove 186, are substantially the same, and are shallower than the depth of the circumferential grooves from the contact surface G to the bottom surface of the circumferential groove 12.

The second resonator R6 has a longitudinal groove 194, a lateral groove 192, and a lateral groove 196. The second resonators R7 have a longitudinal groove 204, a lateral groove 202, and a lateral groove 206.

The second resonators R5, R6, and R7 are provided in order along the tire circumferential direction. Amongst the second resonators R5, R6, and R7, the lengths of the longitudinal grooves are each different, and due to this, these resonators respond to different resonant frequency bands.

(3.2) Second Modification

Figure 9:
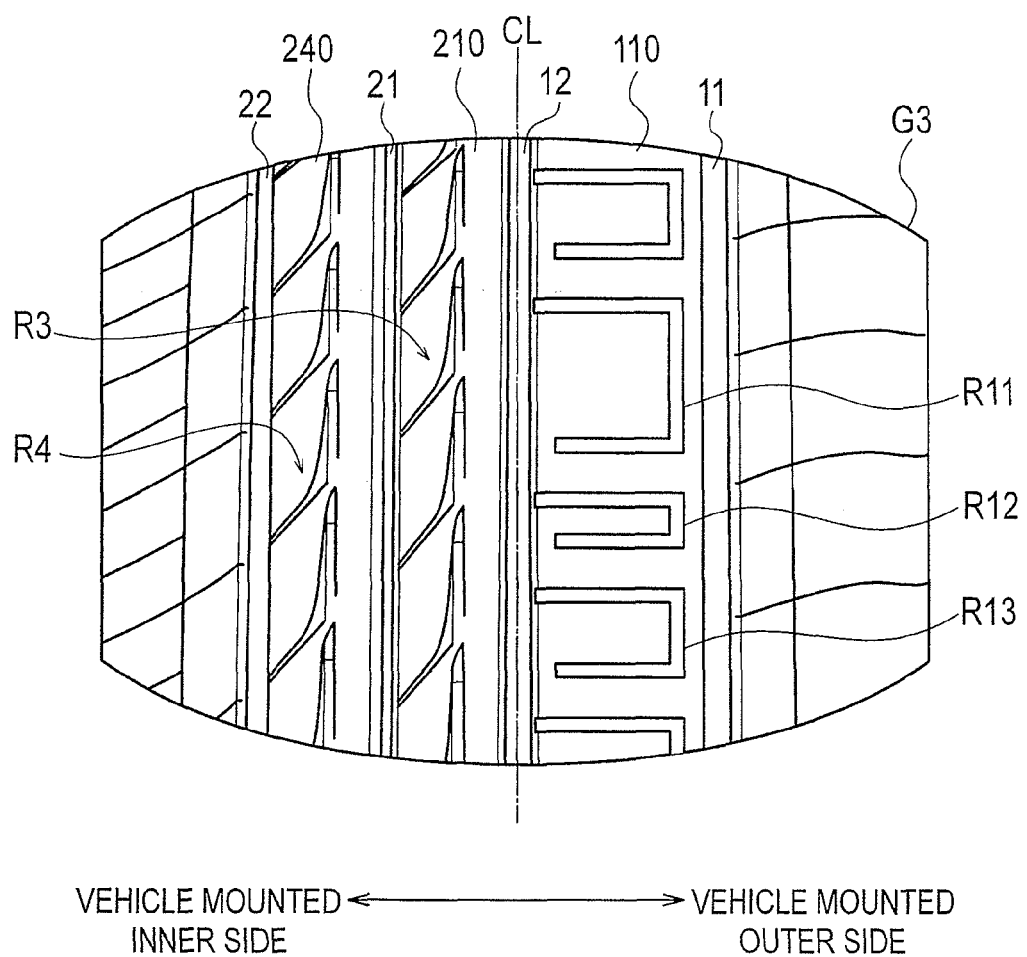
FIG. 9 is a partial front view of the tire according to a second modification of the embodiment of the present invention.
Figure 10:
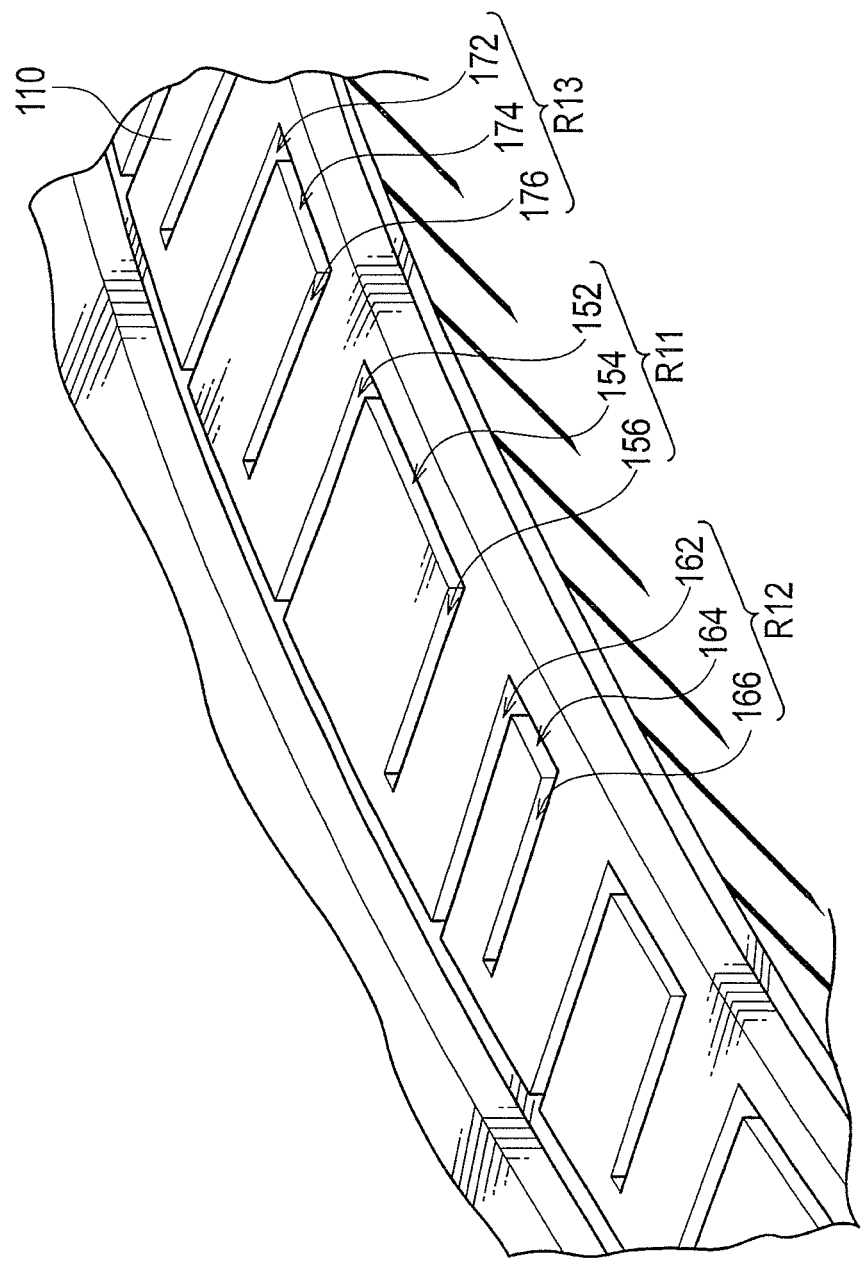
FIG. 10 is a partial perspective view of the rib-like land portion 110 according to the second modification of the embodiment of the present invention.

FIG. 9 is a partial front view of the tire according to a second modification of the embodiment of the present invention. Specifically, FIG. 9 is a front view of a contact surface G3 according to the second modification of the embodiment of the present invention. FIG. 10 is a partial perspective view of the rib-like land portion 110 according to the second modification of the embodiment of the present invention.

As illustrated in FIG. 9, on the rib-like land portion 110, first resonators R11, R12, and R13 that consist of side-branch resonators in a single row along the tire circumferential direction are provided. Although in the embodiment mentioned above, the first resonators R1 and the first resonators R2 are provided in two rows along the tire circumferential direction, the present invention is not limited to this. Specifically, on the rib-like land portion 110, the first resonators R11, R12, and R13 which are recessed inward in the tire radial direction and which each form a predetermined space when the rib-like land portion 110 makes contact with the road surface RS are provided. The first resonators R11, R12, and R13, similar to the first modification, have longitudinal grooves and lateral grooves. Specifically, the first resonator R11 has a longitudinal groove 154, a lateral groove 152, and a lateral groove 156. The first resonator R12 has a longitudinal groove 164, a lateral groove 162, and a lateral groove 166. The first resonator R13 has a longitudinal groove 174, a lateral groove 172, and a lateral groove 176.

(3.3) Third Modification

Figure 11:
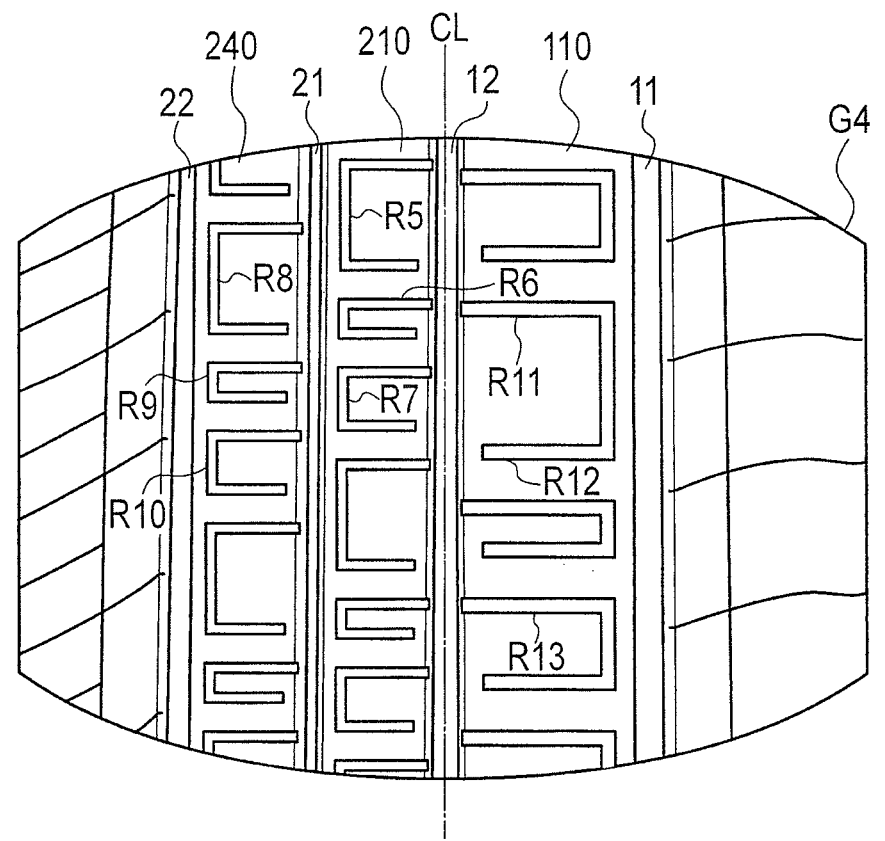
FIG. 11 is a partial front view of the tire according to a third modification of the embodiment of the present invention.

FIG. 11 is a partial front view of the tire according to a third modification of the embodiment of the present invention. Specifically, FIG. 11 is a front view of a contact surface G4 according to the third modification of the embodiment of the present invention.

As illustrated in FIG. 11, on the rib-like land portion 110, the rib-like land portion 210, and the rib-like land portion 240, second resonators R5, R6, R7, R8, R9, and R10, and first resonators R11, R12, and R13, which are side-branch resonators, are provided.

(3.4) Fourth Modification

Figure 12:
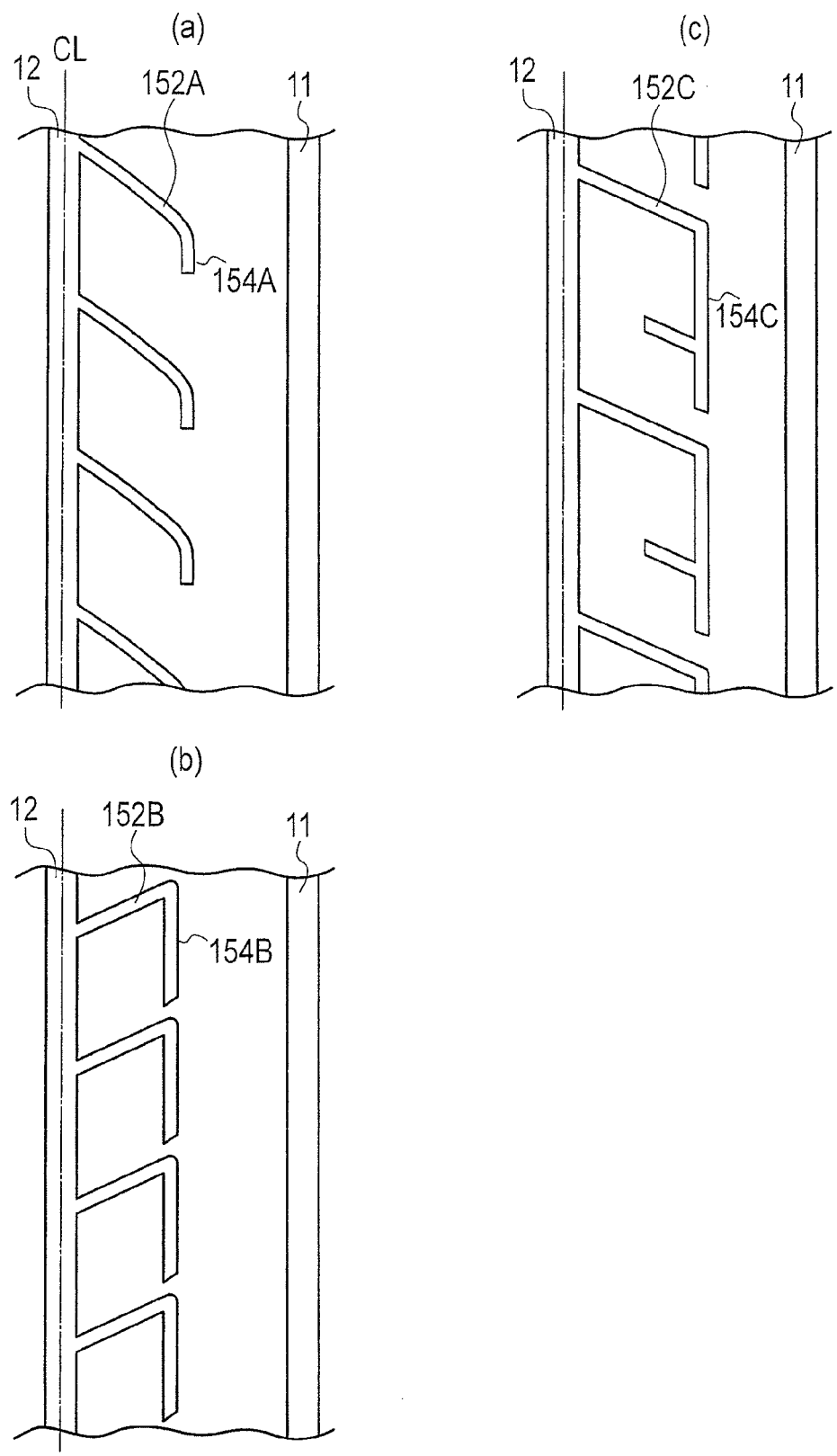
FIG. 12 is a partial front view of the tire according to a fourth modification of the embodiment of the present invention.

FIG. 12 is a partial front view of the tire according to a fourth modification of the embodiment of the present invention. In the first through third modifications, when viewed from the tread surface, the longitudinal groove 184 of the first resonator R5 extends along the tire circumferential direction, and the lateral groove 182 and the lateral groove 186 extend along the tread width direction. The shape of the longitudinal grooves and the lateral grooves of the first resonators and the second resonators, which are of side-branch resonators, is not limited to this. For example, as illustrated in FIG. 12(a), the first resonator, which is of a side-branch resonator, may have a lateral groove 152A extending diagonally along the tread width direction, and a longitudinal groove 154A extending along the tire circumferential direction, and a portion of that is of a curved shape. Also, the first resonator like this may be formed in a plurality along the tread width direction and the tire circumferential direction. Also, the side-branch resonator may be of an identical shape along the tire circumferential direction.

Also, as illustrated in FIG. 12(b), a side-branch resonator may be formed by a lateral groove 152B extending diagonally along the tread width direction, and a longitudinal groove 154B extending along the tire circumferential direction.

Also, as illustrated in FIG. 12(c), a side-branch resonator may have a lateral groove 156C in a position other than the end of 154C and the longitudinal groove extending along the tire circumferential direction.

(4) Comparative Evaluations

Next, a method of experiments for comparative evaluations of a pneumatic tire according to examples having a pattern similar to the pneumatic tire 10 mentioned above, and another pneumatic tire according to a comparative example will be explained along with results.

(4.1) Method of Experiments

Using an experimental vehicle, noise levels, of the pneumatic tires according to examples and a comparative example, were measured. The experimenting conditions of the comparative evaluations are as follows.

Figure 13:
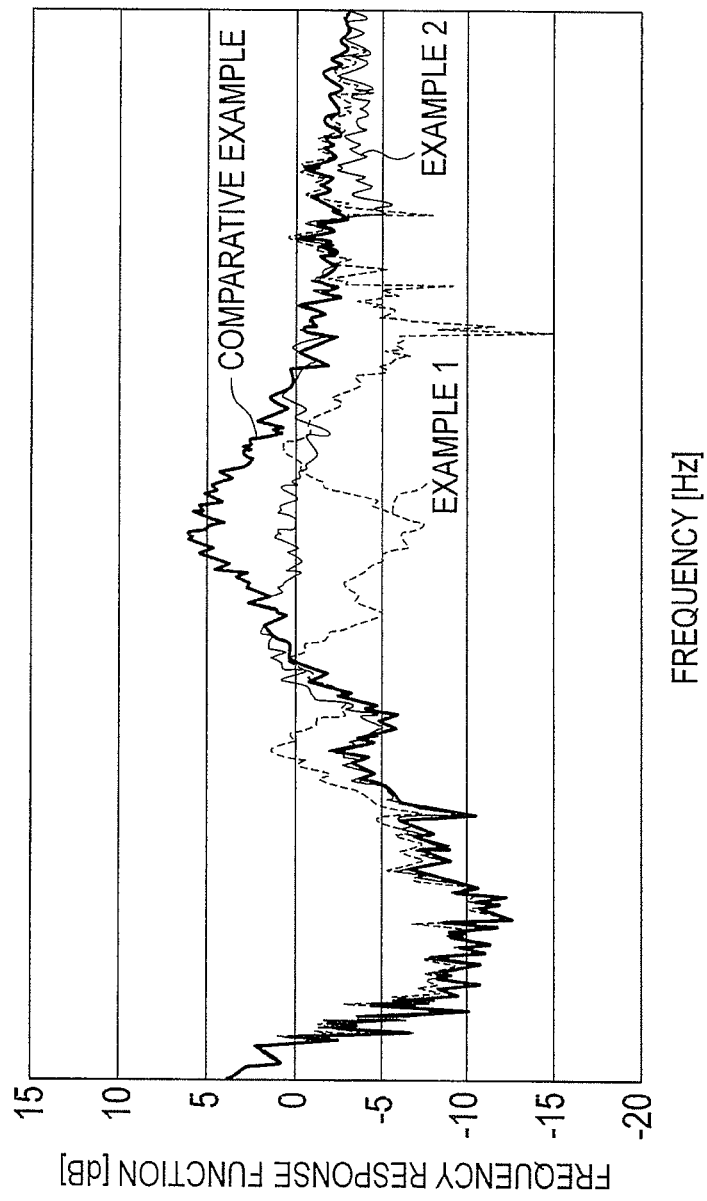
FIG. 13 is a graph illustrating the results of the experiments according to comparative evaluations of the present invention.

Experimental Vehicle: sedan-type passenger vehicle (Japanese Car)
    Size of Tires Used: 215/55R17
    Size of Rims Used: 7J×17
    Inner Pressure Setting: 210 kPa Load Setting: 4.41 kN
Driving Speed: 80 km/h
Measuring Method: a microphone was placed inside the vehicle to measure noise (4.2) Results of Experiments FIG. 13 illustrates the results of the experiments according to the comparative evaluations mentioned above.

A comparative example 1 is a pneumatic tire that is not provided with resonators. An example 1 is a pneumatic tire so configured that the first resonators which are, when the tire is mounted on the vehicle, located on the outer side of the pneumatic tire 10 are provided on the entire tread. An example 2 is a pneumatic tire so configured that the second resonators which are, when the tire is mounted on the vehicle, located on the inner side of the pneumatic tire 10 are provided on the entire tread. In other words, the example 2 is a pneumatic tire configured in such way that the volume of the air chambers is less than that of the example 1, yet the number of the air chambers is greater than that of the example 1.

As illustrated in FIG. 13, the noise level is lowered by providing of resonators. Especially, with the pneumatic tire according to the example 1, when compared to the comparative example 1, external noise having a loudness level peak at around 1 kHz can be remarkably suppressed. Also, with the pneumatic tire according to the example 2, when compared to the comparative example 1, external noises in a wide range of frequencies can be effectively suppressed.

(5) Operation and Effect

According to the pneumatic tire 10 mentioned above, the number of the second resonators R3 and the second resonators R4 which configure the second resonators which are, when the tire is mounted on the vehicle, located on the inner side of the first resonators is greater than the number of the first resonators R1 and the first resonators R2 which configure the first resonators. For this reason, on the rib-like land portion 210 (rib-like land portion 240) where the second resonators R3 and the second resonators R4 are provided, more recessed portions 221 are formed than on the rib-like land portion 110 where the first resonators R1 and the first resonators R2 are provided. Due to this, the block stiffness of the rib-like land portion 210 (rib-like land portion 240) becomes lower than the block stiffness of the rib-like land portion 110, and road noise, relayed by such as the suspension or the body and propagated in the car can be reduced. Especially, since road noise is easily relayed from the inner side portion, when the tire is mounted on the vehicle, of the pneumatic tire 10, close to the suspension and axle shaft, by arranging the second resonators R3 and the second resonators R4 in large numbers on the vehicle mounted inner side, road noise generated from the related portion can effectively be suppressed.

Also, with the first resonators R1 and the first resonators R2 which are, when the tire is mounted on the vehicle, arranged on the outer side of the second resonators R3 and the second resonators R4, external noise such as passage noise which is easily propagated externally from the vehicle can also be reduced.

In other words, with the pneumatic tire 10, reduction of internal noise such as road noise, and reduction of external noise such as passage noise caused by air column tube resonance sound can both be managed at a high level.

In this embodiment, the volume of the first resonators R1 (first resonators R2) is greater than the volume of the second resonators R3 (second resonators R4). Due to this, the first resonators R1 (first resonators R2) can remarkably reduce external noise having a loudness level peak at around 1 kHz.

Also, the volume of the second resonators R3 (second resonators R4) is less than the volume of the first resonators R1 (first resonators R2), yet the number of the second resonators R3 (second resonators R4) is greater than the number of the first resonators R1 (first resonators R2). Due to this, the second resonators R3 (second resonators R4), in the frequency band that configures the external noise, can reduce external noise in a wide range of frequencies. Therefore, with the pneumatic tire 10, external noise can further efficiently be reduced.

In this embodiment, the second resonators R3 (second resonators R4) include the air chamber 220 which is recessed inward in the tire radial direction, and the constrictive groove 230 that communicates to the air chamber 220 and the circumferential groove 21. Also, the volume of the space formed by the constrictive groove 230 and the road surface RS, is less than the volume of the space formed by the air chamber 220 and the road surface RS. While one end of the constrictive groove 230 communicates to the closed space formed by the air chamber 220 and the road surface RS, the other end of the constrictive groove 230 communicates to at least one of the plurality of the circumferential grooves.

In other words, the second resonators R3 (second resonators R4) function as Helmholtz resonators. Therefore, with the pneumatic tire 10, reduction of internal noise such as road noise and reduction of external noise can both be managed at a high level.

(6) Other Embodiments

As described above, although the content of the present invention was disclosed through the embodiment of the present invention, the descriptions and drawings that form a part of this disclosure are not to be considered as limitations to the present invention. From this disclosure, various alternate embodiments, examples, and operation technology will become apparent to one skilled in the art.

For example, the shape of the Helmholtz resonator is not necessarily limited to that of the first resonator R1 and the first resonator R2 described above, as each may be of a different shape, or may be of a shape other than that of the first resonator R1 and the first resonator R2.

Also, although in the embodiment described above, the circumferential grooves 11, 12, 21, and 22 extend linearly along the tire circumferential direction, the circumferential grooves, as long as they extend along the tire circumferential direction, are not necessarily limited to being linear, and may be of a zigzag shape or a wave shape.

As described above, needless to say, the present invention includes various embodiments and the like not described here. Therefore, the technical range of the present invention is to be defined only by the inventive specific matter according to the adequate claims from the above description.

The entire contents of Japanese Patent Application No. 2009-185275 (filed on Aug. 7, 2009) are incorporated in the present specification by reference.

INDUSTRIAL APPLICABILITY

As stated in the above, the tire according to the present invention, because it is possible to manage reduction of internal noise such as road noise, and reduction of external noise such as passage noise caused by air column tube resonance sound, using resonators that form a fixed space when making contact with the road surface, both at a high level, is valuable in the manufacturing field of tires.

REFERENCE NUMERAL

CL . . . tire equator line, D1, D2, D3 . . . direction, G, G2, G3, G4 . . . contact surface, P . . . pitch, Pc . . . central portion, Ps . . . shoulder portion, R1, R2, R5, R11, R12, R13 . . . first resonator, R3, R4, R6, R7, R8, R9, R10 . . . second resonator, RS . . . road surface, S . . . cross sectional area, 110, 210, 240 . . . rib-like land portion, 120A, 120B . . . land portion, 121 . . . constrictive groove, 121a, 121b . . . end, 122 . . . narrow groove, 130A, 130B . . . air chamber, 131 . . . recessed portion, 132 . . . bottom surface, 132a . . . highest position, 132b . . . lowest position, 140 . . . land portion, 152, 152A, 152B, 156, 156C, 162, 166, 172, 176, 182, 186, 192, 196, 202, 206 . . . lateral groove, 154, 164, 174, 184, 194, 204 . . . longitudinal groove, 188 . . . bottom surface, 210 . . . rib-like land portion, 210 . . . rib-like land portion, 210, 240 . . . rib-like land portion, 211 . . . land portion, 220 . . . air chamber, 220a, 220b . . . end, 221 . . . recessed portion, 222 . . . bottom surface, 223 . . . curved portion, 223a, 223b . . . end, 224 . . . linear portion, 224a, 224b . . . end, 230 . . . constrictive groove, 231 . . . outer groove, 232 . . . inner groove, 240 . . . rib-shape land portion, 241 . . . land portion, 250 . . . air chamber

The invention claimed is:

1. A tire comprising:
   a plurality of rib-like land portions partitioned by a plurality of circumferential grooves which extend along a tire circumferential direction; and
   resonators recessed inward in a tire radial direction, forming a predetermined space when the rib-like land portions make contact with a road surface, and communicating with the circumferential groove,
   wherein the resonators include,
   first resonators provided in a plurality on the rib-like land portion, and
   second resonators located on an inner side of the first resonators when the tire is mounted on a vehicle, and provided in a plurality on at least one of the rib-like land portions, and
   the number of the second resonators is greater than the number of the first resonators, the first resonator includes,
     an air chamber recessed inward in the tire radial direction, assuming a highest position being a grounding surface at which the rib-shaped land portion makes contact with a road surface, a bottom surface of the air chamber gradually changes, along the tire circumferential direction, from a portion where a depth from the grounding surface is deepest to the highest position, and
     a constrictive groove communicating with the air chamber and the circumferential groove, and
     a volume of the space formed by the constrictive groove and the road surface is less than a volume of the space formed by the air chamber and the road surface, and
     one end of the constrictive groove communicates with a closed space formed by the air chamber and the road surface, the other end of the constrictive groove communicates with at least one of the plurality of the circumferential grooves, and the constrictive groove forms the Helmholtz resonator,
   wherein the bottom surface of the air chamber repeats in an arch shape in a cross sectional view along the tire circumferential direction and the center of the arch shape is positioned at a further inside of a tire radial direction than the bottom surface.

2. The tire according to claim 1, wherein, the second resonator includes,
   an air chamber recessed inward in the tire radial direction, and
   a constrictive groove communicating with the air chamber and the circumferential groove, and
   a volume of a space formed by the constrictive groove and the road surface is less than a volume of a space formed by the air chamber and the road surface, and
   one end of the constrictive groove communicates with a closed space formed by the air chamber and the road surface, and the other end of the constrictive groove communicates with at least one of the plurality of the circumferential grooves.

3. The tire according to claim 2, wherein,
   a volume of a space formed by a groove of the first resonator recessed inward in the tire radial direction and the road surface is greater than a volume of a space formed by the constrictive groove and the air chamber of the second resonator and the road surface.

* * * * *